(12) United States Patent
Minowa et al.

(10) Patent No.: US 10,690,603 B2
(45) Date of Patent: Jun. 23, 2020

(54) WATER VAPOR OBSERVING SYSTEM

(71) Applicant: Furuno Electric Co., Ltd., Nishinomiya (JP)

(72) Inventors: Masahiro Minowa, Nishinomiya (JP); Koji Yano, Itami (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 266 days.

(21) Appl. No.: 15/748,052

(22) PCT Filed: Jun. 8, 2016

(86) PCT No.: PCT/JP2016/066984
§ 371 (c)(1),
(2) Date: Jan. 26, 2018

(87) PCT Pub. No.: WO2017/018061
PCT Pub. Date: Feb. 2, 2017

(65) Prior Publication Data
US 2018/0209919 A1    Jul. 26, 2018

(30) Foreign Application Priority Data
Jul. 28, 2015   (JP) ................................ 2015-148467

(51) Int. Cl.
*G01N 22/04*    (2006.01)
*G01S 13/95*    (2006.01)
(Continued)

(52) U.S. Cl.
CPC ............ *G01N 22/04* (2013.01); *G01S 13/003* (2013.01); *G01S 13/951* (2013.01); *G01W 1/00* (2013.01); *G01W 1/14* (2013.01); *Y02A 90/18* (2018.01)

(58) Field of Classification Search
CPC .......... G01N 22/04; G01W 1/14; G01W 1/00; G01S 13/003; G01S 13/951; Y02A 90/18
(Continued)

(56) References Cited

U.S. PATENT DOCUMENTS 4,876,647 A  * 10/1989  Gardner ................. A01G 25/16
                                                             700/284
2009/0160700 A1   6/2009  Messer-Yaron et al.

FOREIGN PATENT DOCUMENTS

EP        2688223 A1     1/2014
JP     H02280083 A     11/1990
(Continued)

OTHER PUBLICATIONS

ISA Japan Patent Office, International Search Report Issued in PCT Application No. PCT/JP2016/066984, dated Aug. 23, 2016, WIPO, 4 pages. (Submitted with English Translation of International Search Report).

(Continued)

*Primary Examiner* — Frank J McGue
(74) *Attorney, Agent, or Firm* — Alleman Hall Creasman & Tuttle LLP

(57) ABSTRACT

A water vapor observing system which is capable of observing water vapor regardless of a situation of an external system may be provided. The water vapor observing system may be configured to observe water vapor contained within atmospheric air, and include a transmission unit configured to transmit transmission waves, one of a reception unit configured to receive reflection waves caused by the transmission waves reflected on and returned from a stationary object as reception waves, and a reception unit disposed at a different position from the transmission unit and configured to receive the transmission waves as reception waves, and a relative water vapor amount calculating module configured to calculate a relative water vapor amount that is a (Continued)

relative value of water vapor with respect to a reference water vapor amount being a comparison target, based on the reception wave received by the one of the reception units.

8 Claims, 16 Drawing Sheets

(51) Int. Cl.
    *G01S 13/00*     (2006.01)
    *G01W 1/14*     (2006.01)
    *G01W 1/00*     (2006.01)

(58) Field of Classification Search
    USPC ........................................................ 342/26 R
    See application file for complete search history.

(56) References Cited

FOREIGN PATENT DOCUMENTS

| JP | H05223951 A | 9/1993 |
|---|---|---|
| JP | 2001231716 A | 8/2001 |
| JP | 2004093291 A | 3/2004 |

OTHER PUBLICATIONS

Kawamura, S. et al., "Water Vapor Observation Using Digital Terrestrial Broadcasting Waves," Radio Science, Mar. 8, 2017, 11 pages. (See Background of Specification for Explanation of Relevance).

Nishio, M. et al., "Development of Nano-Satellites for Regional Disaster Prevention," Industry-University-Government Collaborated Activities in Kagoshima, Nov. 9, 2006, 6 pages.

Masanori N. et al., "Development of Nano-Satellites for Regional Disaster Prevention," Industry University Government Collaborated Activities in Kagoshima, 7 pages.

European Patent Office, Extended European Search Report Issued in Application No. 16830166.1, dated Feb. 26, 2019, 9 pages.

Giuli, D. et al., "The Exploitation of Attenuation Measurements for Atmosphere Monitoring," Proceedings of the 2000 Geoscience and Remote Sensing Symposium, Jul. 24, 2000, Piscataway, New Jersey, 3 pages.

* cited by examiner

WATER VAPOR OBSERVING SYSTEM

CROSS REFERENCE TO RELATED APPLICATIONS

This application is a U.S. National stage of International Application No. PCT/JP2016/066984 filed on Jun. 8, 2016, which in turn claims priority to Japanese Patent Application No. 2015-148467 filed on Jul. 28, 2015, the entire disclosure of each of which is hereby incorporated herein by reference for all purposes.

TECHNICAL FIELD

The present disclosure relates to a water vapor observing system, which observes water vapor contained within atmospheric air.

BACKGROUND ART

As a conventionally-known water vapor observing system, for example, Non-patent Document 1 discloses a system which observes a water vapor amount contained within atmospheric air using a passive radar. This system measures a water vapor amount at a desired location by obtaining a propagation delay of a digital terrestrial broadcasting wave transmitted from a broadcast tower.

REFERENCE DOCUMENT OF CONVENTIONAL ART

Non-Patent Document

[Non-patent Document 1] Seiji Kawamura, "Water Vapor Observation Using Digital Terrestrial Broadcasting Waves," [Online] National Institute of Information and Communications Technology, [searched on Jun. 22, 2015]

DESCRIPTION OF THE DISCLOSURE

Problems to be Solved by the Disclosure

Here, with the above system, for example, when a transmission condition etc. of the digital terrestrial broadcasting wave is changed, enhancement may be needed for the system according to the change.

The present disclosure is for solving the above issue, and aims to provide a water vapor observing system, which is capable of observing water vapor regardless of a situation of an external system.

Summary of the Disclosure (1) In order to solve the above issue, according to one aspect of the present disclosure, a water vapor observing system configured to observe water vapor contained within atmospheric air may be provided. The water vapor observing system may include a transmission unit (which may also be referred to as a transmitter circuitry), a first reception unit (which may also be referred to as a first receiver circuitry), a second reception unit (which may also be referred to as a second receiver circuitry), and a position-based relative water vapor amount calculating module (which may also be referred to as processing circuitry). The transmission unit may transmit transmission waves. The first reception unit may be a reception unit disposed at a different position from the transmission unit and configured to receive one of the transmission waves as a first reception wave (which may also be referred to as a first wave). The second reception unit may be a reception unit disposed at a different position from the transmission unit and the first reception unit and configured to receive one of the transmission waves as a second reception wave (which may also be referred to as a second wave). The position-based relative water vapor amount calculating module may calculate, based on the first and second reception waves, an amount of water vapor in a passing area of the second reception wave with reference to an amount of water vapor in a passing area of the first reception wave, as a position-based relative water vapor amount (which may also be referred to as a relative amount of water vapor).

(2) The water vapor observing system may include a plurality of the second reception units disposed at different positions from each other.

(3) Further, the transmission unit, the first reception unit, and the plurality of second reception units may be arranged so that straight lines connecting them with each other form a lattice shape when seen from above.

(4) The water vapor observing system may include a transmission-reception unit in which the transmission unit and the reception unit are integrated.

(5) Further, the water vapor observing system may include a transponder provided as the transmission-reception unit and configured to transmit a transmission wave (which may also be referred to as a third wave) in response to receiving the transmission wave from the transmission unit at a different position.

(6) One of the transmission unit and the reception unit may be disposed higher than the other.

(7) The position-based relative water vapor amount calculating module may calculate the position-based relative water vapor amount based on a first attenuation amount obtained by subtracting an echo level of the first reception wave from a level of the transmission wave and a second attenuation amount obtained by subtracting an echo level of the second reception wave from the level of the transmission wave.

(8) In order to solve the above issue, according to another aspect of the present disclosure, a water vapor observing system configured to observe water vapor contained within atmospheric air may be provided. The water vapor observing system may include a transmission unit, a reception unit, and a time-based relative water vapor amount calculating module. The transmission unit may transmit a first transmission wave and a second transmission wave after the first transmission wave. The reception unit may be one of a reception unit configured to receive reflection waves caused by the first and second transmission waves reflected on and returned from a stationary object as first and second reception waves, respectively, and a reception unit disposed at a different position from the transmission unit and configured to receive the first and second transmission waves as first and second reception waves, respectively. The time-based relative water vapor amount calculating module may calculate, based on the first and second reception waves, an amount of water vapor in an area through which the second transmission wave passes after the second transmission wave is transmitted until it is received by the reception unit, with reference to an amount of water vapor in an area through which the first transmission wave passes after the first transmission wave is transmitted until it is received by the reception unit, as a time-based relative water vapor amount.

(9) The water vapor observing system may include a plurality of the one of the reception units disposed at positions different from each other and from the transmission unit and configured to receive the first and second transmission waves as the first and second reception waves, respectively.

(10) Further, the transmission unit and the plurality of the one of reception units may be arranged so that straight lines connecting them with each other form a lattice shape when seen from above.

(11) One of the transmission unit and the one of the reception units may be disposed higher than the other.

(12) The time-based relative water vapor amount calculating module may calculate the time-based relative water vapor amount based on a first attenuation amount obtained by subtracting an echo level of the first reception wave from a level of the first transmission wave and a second attenuation amount obtained by subtracting an echo level of the second reception wave from a level of the second transmission wave.

(13) In order to solve the above issue, according to another aspect of the present disclosure, a water vapor observing system configured to observe water vapor contained within atmospheric air may be provided. The water vapor observing system may include a transmission unit, a reception unit, and a relative water vapor amount calculating module. The transmission unit may transmit transmission waves. The reception unit may be one of a reception unit configured to receive reflection waves caused by the transmission waves reflected on and returned from a stationary object as reception waves, and a reception unit disposed at a different position from the transmission unit and configured to receive the transmission waves as reception waves. The relative water vapor amount calculating module may calculate a relative water vapor amount that is a relative value of water vapor with respect to a reference water vapor amount being a comparison target, based on the reception waves received by the one of the reception units.

(14) The water vapor observing system may include a first reception unit being the one of the reception units, disposed at a different position from the transmission unit, and configured to receive one of the transmission waves as a first reception wave, and a second reception unit being the one of the reception units, disposed at a different position from the transmission unit and the first reception unit, and configured to receive one of the transmission waves as a second reception wave. The relative water vapor amount calculating module may be a position-based relative water vapor amount calculating module configured to calculate, based on the first and second reception waves, a position-based relative water vapor amount that is an amount of water vapor in a passing area of the second reception wave with reference to an amount of water vapor in a passing area of the first reception wave, as the relative water vapor amount.

(15) Further, the position-based relative water vapor amount calculating module may calculate the position-based relative water vapor amount based on a first attenuation amount obtained by subtracting an echo level of the first reception wave from a level of the transmission wave and a second attenuation amount obtained by subtracting an echo level of the second reception wave from the level of the transmission wave.

(16) The transmission unit may transmit, as the transmission waves, a first transmission wave and a second transmission wave after the first transmission wave. The reception unit may receive reflection waves caused by the first and second transmission waves reflected on and returned from a stationary object as first and second reception waves, respectively, or may be disposed at a different position from the transmission unit and may receive the first and second transmission waves as first and second reception waves that are the reception waves, respectively. The relative water vapor amount calculating module may be a time-based relative water vapor amount calculating module configured to calculate, based on the first and second reception waves, a time-based relative water vapor amount that is an amount of water vapor in an area through which the second transmission wave passes after the second transmission wave is transmitted until it is received by the reception unit, with reference to an amount of water vapor in an area through which the first transmission wave passes after the first transmission wave is transmitted until it is received by the reception unit, as the relative water vapor amount.

(17) Further, the time-based relative water vapor amount calculating module may calculate the time-based relative water vapor amount based on a first attenuation amount obtained by subtracting an echo level of the first reception wave from a level of the first transmission wave and a second attenuation amount obtained by subtracting an echo level of the second reception wave from a level of the second transmission wave.

(18) The water vapor observing system may further include a display unit (which may also be referred to as a display) configured to display an index of the position-based relative water vapor amount calculated by the position-based relative water vapor amount calculating module.

(19) Further, the display unit may display, as the index, a distribution of the position-based relative water vapor amounts calculated by the position-based relative water vapor amount calculating module.

(20) The water vapor observing system may include a display unit configured to display an index of the time-based relative water vapor amount calculated by the time-based relative water vapor amount calculating module.

(21) Further, the display unit may display, as the index, a distribution of the time-based relative water vapor amounts calculated by the time-based relative water vapor amount calculating module.

Effect of the Disclosure

According to the present disclosure, a water vapor observing system which is capable of observing water vapor regardless of a situation of an external system, may be provided.

BRIEF DESCRIPTION OF DRAWINGS

FIGS. 2(A) and 2(B) are block diagrams illustrating configurations of a transmission unit and reception units illustrated in FIG. 1, in which FIG. 2(A) is a block diagram illustrating the configuration of the transmission unit and FIG. 2(B) is a block diagram illustrating the configuration of each reception unit.

MODES FOR CARRYING OUT THE DISCLOSURE

Figure 1:
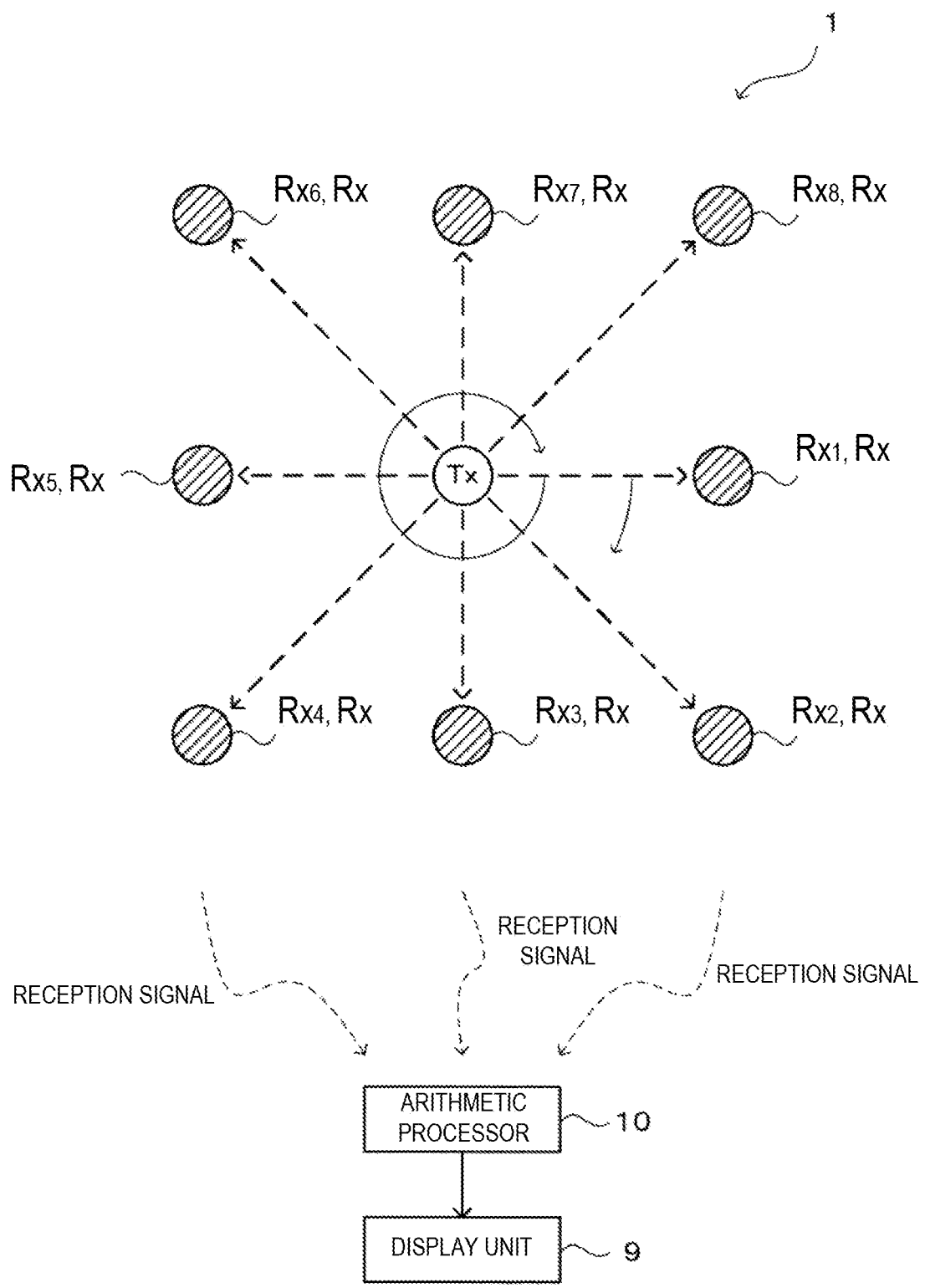
FIG. 1 is a schematic view illustrating a configuration of a water vapor observing system according to one embodiment of the present disclosure.
Figure 2:
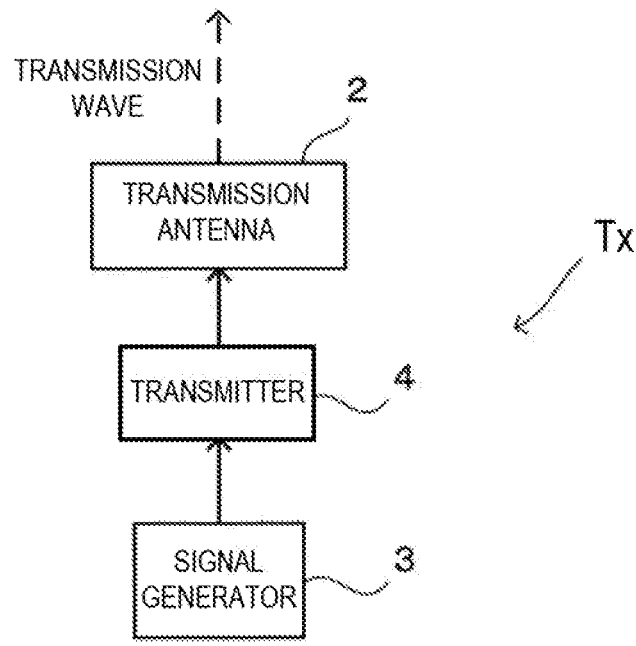
Figure 2:
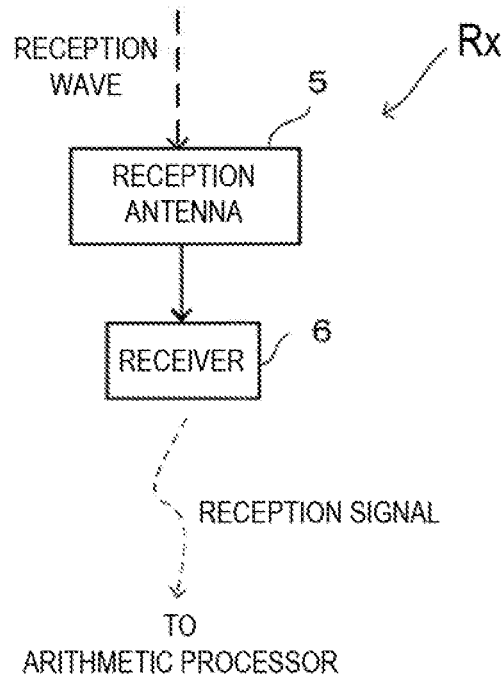
Figure 3:
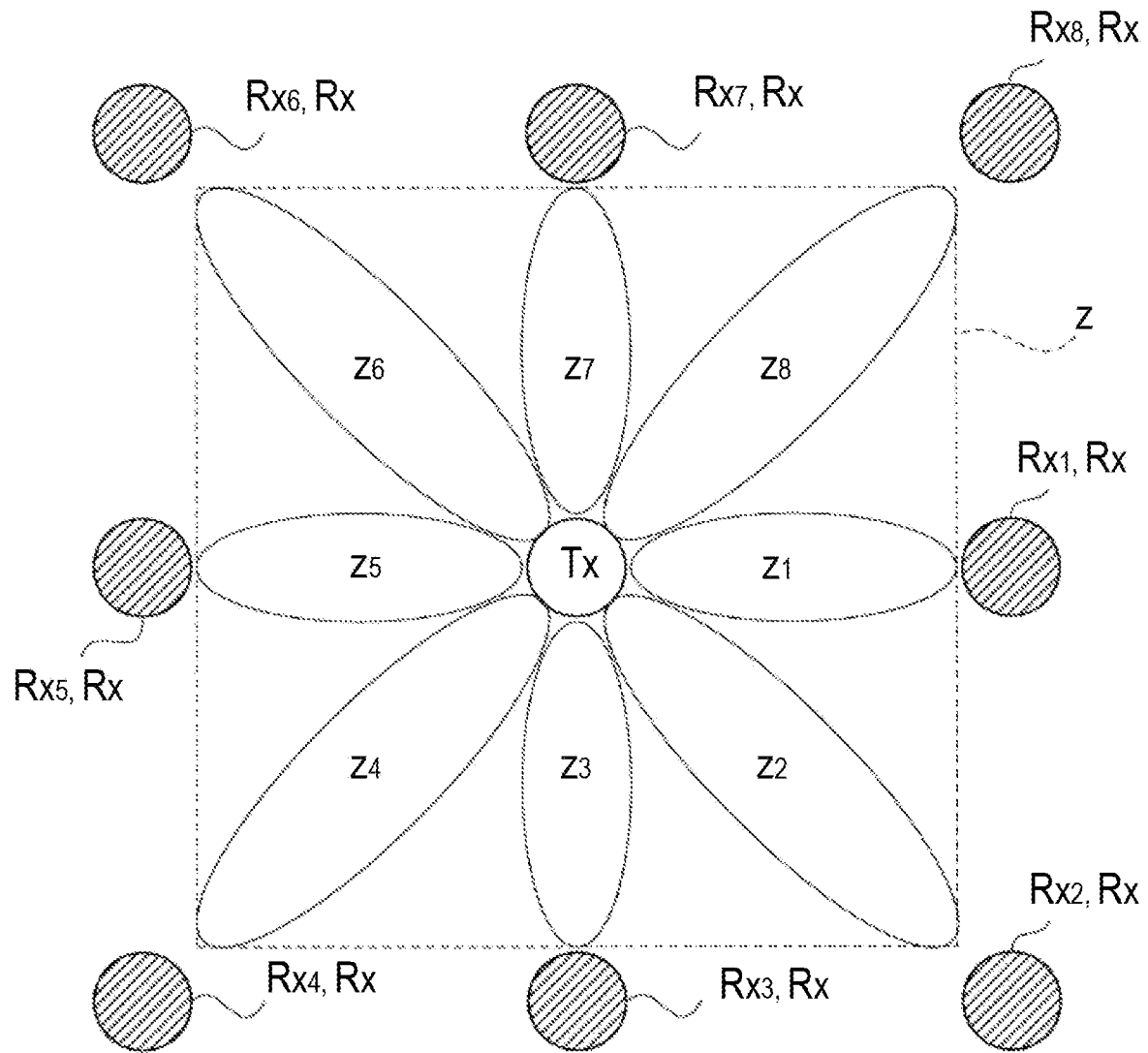
FIG. 3 is a view schematically illustrating a positional relationship of the transmission unit and the reception units with a water vapor observation area Z and respective areas Z1 to Z8.

FIG. 1 is a schematic view illustrating a configuration of a water vapor observing system 1 according to one embodiment of the present disclosure. Further, FIGS. 2(A) and 2(B) are block diagrams illustrating configurations of a transmission unit Tx and reception units Rx, in which FIG. 2(A) is a block diagram illustrating the configuration of the transmission unit Tx and FIG. 2(B) is a block diagram illustrating the configuration of each reception unit Rx. Moreover, FIG. 3 is a view schematically illustrating a positional relationship of the transmission unit Tx and the reception units Rx with an area where water vapor is observable by the water vapor observing system 1 illustrated in FIG. 1 (water vapor observation area Z) and respective areas Z1 to Z8 included in the water vapor observation area Z.

Hereinafter, the water vapor observing system 1 according to the embodiment of the present disclosure is described with reference to the drawings. With reference to FIGS. 1 and 3, the water vapor observing system 1 illustrated in FIG. 1 may be configured to be capable of calculating relative values of water vapor amounts in the respective areas Z2 to Z8 in the water vapor observation area Z, specifically, water vapor amounts in the areas Z2 to Z8 other than a given area (in this embodiment, an area Z1) with reference to a water vapor amount in the given area (relative water vapor amounts, position-based relative water vapor amounts). Further, the water vapor observing system 1 may be configured to be capable of calculating a distribution of the relative water vapor amounts in the water vapor observation area Z. Note that, the water vapor observation area Z may be, for example, an area of a few dozen km square.

[Overall Configuration]

As illustrated in FIG. 1, the water vapor observing system 1 may include the transmission unit Tx, the plurality of reception units Rx ($Rx_1$ to $Rx_8$), an arithmetic processor 10, and a display unit 9. The reception unit $Rx_1$ may be provided as a first reception unit, and the reception units $Rx_2$ to $Rx_8$ may be provided as second reception units.

As illustrated in FIG. 3, the transmission unit Tx and the reception units Rx may be arranged so that straight lines connecting the transmission unit Tx and the plurality of reception units Rx form a lattice shape in the water vapor observation area Z when seen from above. In the example illustrated in FIG. 3, the transmission unit Tx may be disposed at the center of the water vapor observing area Z, and each reception unit Rx may be disposed near the transmission unit Tx. However, a positional relationship of the transmission unit Tx with the reception units Rx may not be limited to this, and may be other positional relationship.

As illustrated in FIG. 2(A), the transmission unit Tx may have a transmission antenna 2, a signal generator 3, and a transmitter 4.

The transmission antenna 2 may be a radar antenna capable of transmitting a radio wave (transmission wave) with strong directivity. The transmission antenna 2 may transmit, for example, a radio wave having a frequency of 22 GHz. While traveling in a distance direction (a radial direction from the transmission antenna 2), the radio wave transmitted from the transmission antenna 2 may attenuate by water vapor on the way and be received by a reception antenna 5 of the reception unit Rx as a reception wave. The transmission antenna 2 may be configured to be 360° rotatable on a horizontal plane. The transmission antenna 2 may be configured to transmit the radio waves while changing the transmitting direction of the radio wave at a constant rotational speed (changing the antenna angle). Thus, the transmission antenna 2 may transmit the transmission wave to each reception unit Rx at a given time interval T. Note that, the time interval T may correspond to a required time length for the transmission antenna 2 to make one full rotation.

The signal generator 3 may generate the transmission signal to be the basis of the radio wave transmitted from the transmission antenna 2. This transmission signal may be amplified by the transmitter 4 and then outputted to the transmission antenna 2.

Each reception unit Rx may include the reception antenna 5 and a receiver 6.

The reception antenna 5 may be configured to be capable of receiving the radio wave from the transmission antenna 2. The reception antenna 5 may be a radar antenna capable of receiving a radio wave (reception wave) with strong directivity. The reception antenna 5 may be set so that a reception beam is directed to the transmission antenna 2. Each reception antenna 5 may receive the reception wave at the given time interval T. The reception waves received by the reception antenna 5 at the given time interval T may sequentially be outputted to the receiver 6 as reception signals. Note that, below, the radio wave received by the reception antenna 5 of the first reception unit $Rx_1$ may be referred to as a first reception wave, and the radio waves received by the reception antennas 5 of the second reception units $Rx_2$ to $Rx_8$ may be referred to as second reception waves.

Each receiver 6 may amplify the reception signal outputted from the reception antenna 5 and A/D convert the amplified reception signal. Then, the receiver 6 may transmit the reception signal converted into the digital signal, to the arithmetic processor 10.

Figure 4:
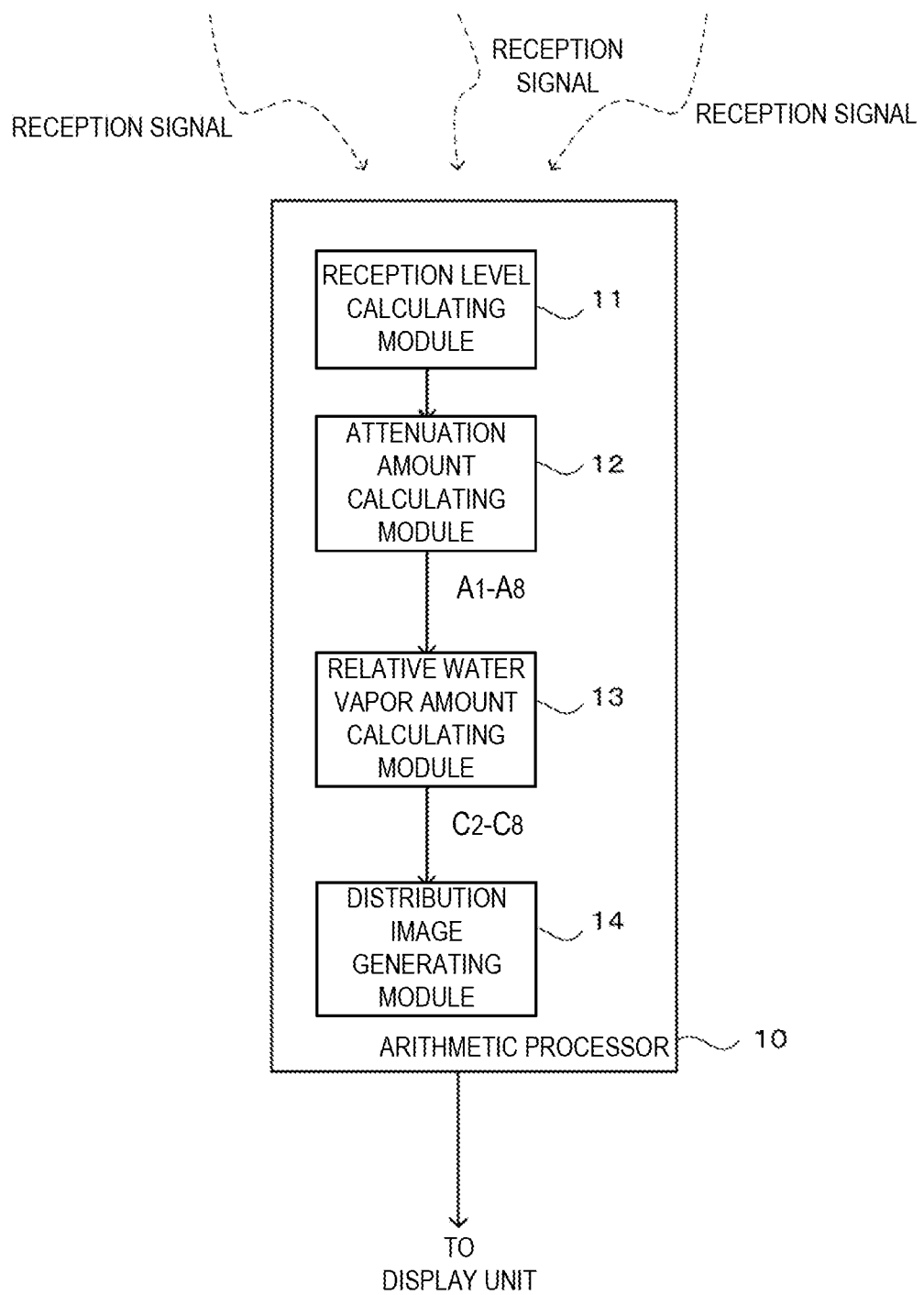
FIG. 4 is a block diagram illustrating a configuration of an arithmetic processor illustrated in FIG. 1.
Figure 5:
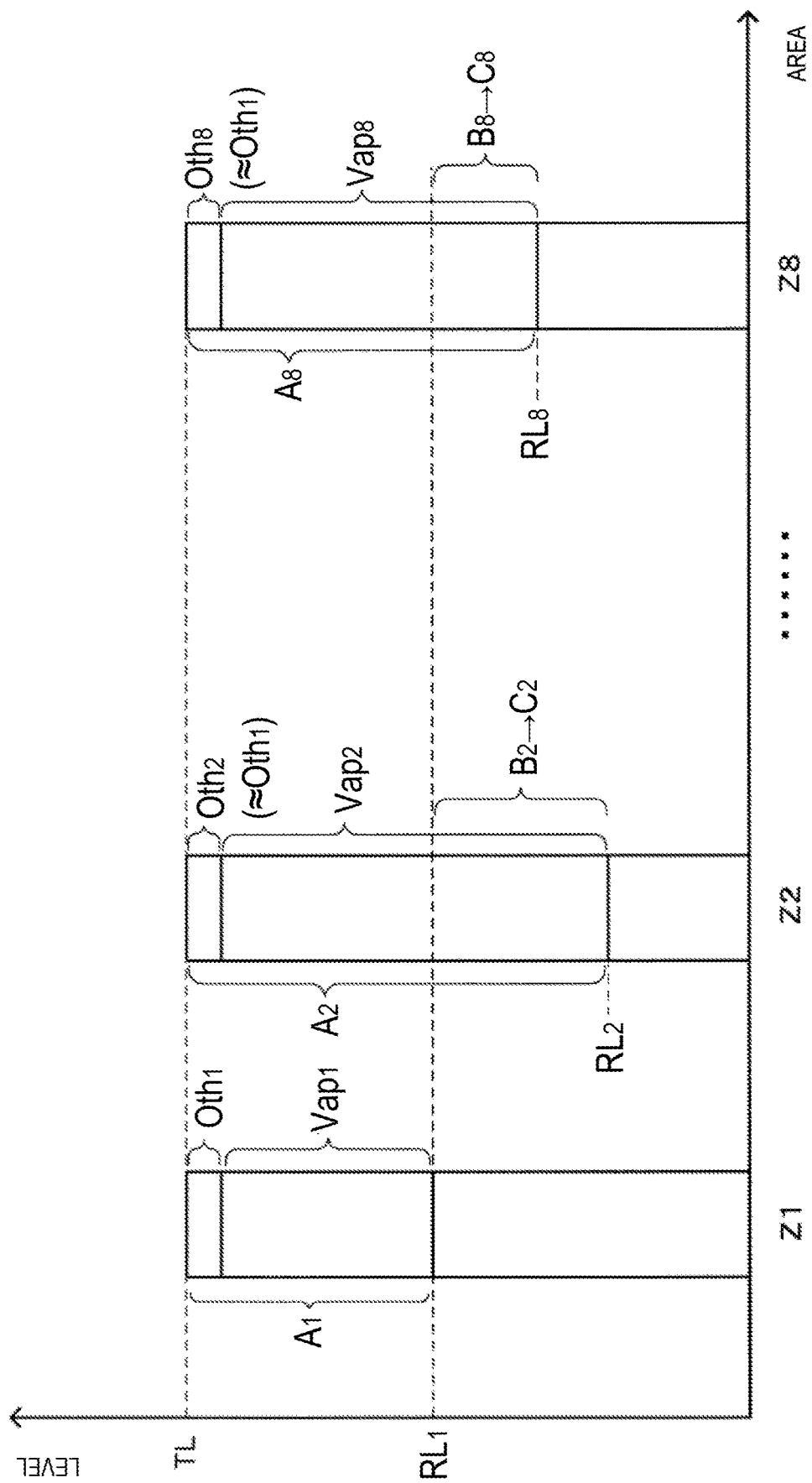
FIG. 5 is a chart illustrating an operation result obtained by processing performed by the arithmetic processor illustrated in FIG. 4.

FIG. 4 is a block diagram illustrating a configuration of the arithmetic processor 10 illustrated in FIG. 1. Further, FIG. 5 is a chart illustrating an operation result obtained by processing performed by the arithmetic processor 10. The arithmetic processor 10 may include a reception level calculating module 11, an attenuation amount calculating module 12, a relative water vapor amount calculating module 13 (position-based relative water vapor amount calculating module), and a distribution image generating module 14. For example, the arithmetic processor 10 may be comprised of devices such as a non-illustrated processor (CPU, FPGA, etc.) and a memory. For example, the CPU may read a program from the memory and execute it to cause the arithmetic processor 10 to function as the reception level calculating module 11, the attenuation amount calculating module 12, the relative water vapor amount calculating module 13 (position-based relative water vapor amount calculating module), and the distribution image generating module 14.

The reception level calculating module 11 may calculate echo levels of the reception waves sequentially received by the reception units $Rx_1$ to $Rx_8$, based on the reception signals transmitted from the respective reception units Rx.

The attenuation amount calculating module 12 may calculate attenuation amounts A ($A_1$ to $A_8$) of the radio waves which passed through the areas Z1 to Z8, respectively, based on level TL of the transmission waves transmitted from the transmission unit Tx and echo levels $RL_1$ to $RL_8$ of the reception waves received by the reception units $Rx_1$ to $Rx_8$, respectively. Specifically, the attenuation amount calculating module 12 may subtract the echo levels of the reception waves received by the reception units $Rx_1$ to $Rx_8$ from the level TL of the transmission waves transmitted from the transmission unit Tx, respectively, and calculate the subtraction values as the attenuation amounts $A_1$ to $A_8$. The attenuation amount calculating module 12 may calculate the attenuation amounts $A_1$ to $A_8$ sequentially at the given time interval T. Note that, the value obtained by subtracting the echo level $RL_1$ of the first reception wave from the level TL of the transmission wave may be calculated as the first attenuation amount $A_1$. Further, the values obtained by subtracting the echo levels $RL_2$ to $RL_8$ of the second reception waves from the level TL of the transmission wave may be calculated as the second attenuation amounts $A_2$ to $A_8$, respectively.

Based on the attenuation amount $A_1$ in a preset reference area (e.g., Z1) and the attenuation amounts $A_2$ to $A_8$ in the other areas Z2 to Z8, the relative water vapor amount calculating module 13 may calculate the water vapor amounts in the areas Z2 to Z8 with reference to the water vapor amount in the area Z1 (relative water vapor amounts $C_2$ to $C_8$). Specifically, the relative water vapor amount calculating module 13 may obtain the subtraction values $B_2$ to $B_8$ by subtracting the attenuation amount $A_1$ in the reference area Z1 from each of the attenuation amounts $A_2$ to $A_8$ in the areas Z2 to Z8. Then, the relative water vapor amount calculating module 13 may calculate the relative water vapor amounts $C_2$ to $C_8$ of the respective areas Z2 to Z8 by multiplying the subtraction values $B_2$ to $B_8$ thus obtained, by a given coefficient. The relative water vapor amount calculating module 13 may calculate the relative water vapor amounts $C_2$ to $C_8$ sequentially at the given time interval T.

Here, the reason why the relative water vapor amounts $C_2$ to $C_8$ can be obtained based on the values which are obtained by subtracting the attenuation amount $A_1$ in the reference area from each of the attenuation amounts $A_2$ to $A_8$ in the areas Z2 to Z8 as in the processing performed by the relative water vapor amount calculating module 13, is explained.

With reference to FIG. 5, the attenuation amounts $A_1$ to $A_8$ of the radio waves propagated through the areas Z1 to Z8 may be considered as water-vapor-attributable attenuation amounts $Vap_1$ to $Vap_8$ attributable to the amount of water vapor in a path through which the radio wave propagated, and other-factor-attributable attenuation amounts $Oth_1$ to $Oth_8$ attributable to other factors, separately. Here, since the areas Z1 to Z8 may be comparatively close to each other, the other-factor-attributable attenuation amounts $Oth_1$ to $Oth_8$ may be considered as substantially the same regardless of the areas Z1 to Z8. Therefore, the other-factor-attributable attenuation amounts $Oth_1$ to $Oth_8$ may be canceled out by subtracting the attenuation amount $A_1$ in the area Z1 from the attenuation amounts $A_2$ to $A_8$ in the areas Z2 to Z8. Thus, it may be understood that the subtraction values $B_2$ to $B_8$ obtained by subtracting the attenuation amount $A_1$ from each of the attenuation amounts $A_2$ to $A_8$ may be values corresponding to the relative water vapor amounts $C_2$ to $C_8$. Therefore, by multiplying the subtraction values $B_2$ to $B_8$ by the given constant, the relative water vapor amounts $C_2$ to $C_8$ of the respective areas Z2 to Z8 may be obtained. Note that, as the constant to be multiplied by the subtraction values $B_2$ to $B_8$, for example, a constant obtained in advance by experiment(s) etc. may be used.

The distribution image generating module 14 may generate a distribution image of the relative water vapor amounts $C_2$ to $C_8$ based on the relative water vapor amounts $C_2$ to $C_8$ of the areas Z2 to Z8 calculated by the relative water vapor amount calculating module 13. The distribution image generating module 14 may sequentially generate the distribution image of the relative water vapor amounts $C_2$ to $C_8$ at the given time interval T.

The display unit 9 may display the distribution image of the relative water vapor amounts $C_2$ to $C_8$ generated by the distribution image generating module 14. The distribution image displayed on the display unit 9 may be updated to a distribution image generated most recently as needed. For example, the display unit 9 may display color tones corresponding to the relative water vapor amounts $C_2$ to $C_8$ of the areas Z2 to Z8 by superimposing them on a map displayed on the display unit 9. For example, an area with a large relative water vapor amount may be illustrated in red, and an area with a small relative water vapor amount may be illustrated in blue. As a result, a user can grasp the relative water vapor amounts $C_2$ to $C_8$ in the respective areas Z2 to Z8.

[Effect]

As described above, in the water vapor observing system 1 of this embodiment, the radio wave transmitted from the transmission unit Tx may attenuate before being received by the reception unit Rx disposed at a different position from the transmission unit Tx, due to water vapor contained in the propagation path of the radio wave. Thus, the radio wave received by the reception unit Rx may contain information regarding water vapor in the propagation path of the radio wave. Therefore, by analyzing the radio waves received by the reception units Rx as in this embodiment, the relative water vapor amounts $C_2$ to $C_8$ which are the relative values of water vapor in the areas Z2 to Z8 with respect to the reference water vapor amount (in this embodiment, the water vapor amount in the area Z1) may be calculated.

Further, the water vapor observing system 1 may calculate the relative water vapor amounts $C_2$ to $C_8$ based on the radio waves transmitted by the system 1. Therefore, for example, compared to a case of calculating the water vapor amount based on the propagation delay of the digital terrestrial broadcasting wave transmitted from the broadcast tower, water vapor may be observed regardless of the conditions of other systems.

Therefore, according to the water vapor observing system 1, a water vapor observing system capable of observing water vapor regardless of conditions of external systems may be provided.

Further in the water vapor observing system 1, the transmission unit Tx, the first reception unit $Rx_1$, and the second reception units $Rx_2$ to $Rx_8$ may be disposed at different positions from each other. Additionally in the water vapor observing system 1, the relative water vapor amounts $C_2$ to $C_8$, which are the water vapor amounts in the passing areas of the second reception waves (respective areas Z2 to Z8) with reference to the water vapor amount in the passing area of the first reception wave (reference area Z1), may be calculated based on the reception waves received by the second reception units $Rx_2$ to $Rx_8$ and the reception wave received by the first reception unit $Rx_1$. That is, according to the water vapor observing system 1, the water vapor amounts in the other areas with reference to the water vapor amount in the reference area Z1) may be calculated.

Further, by providing the plurality of second reception units $Rx_2$ to $Rx_8$, the water vapor observing system 1 may calculate the distribution of the relative water vapor amounts in the water vapor observation area Z.

Further in the water vapor observing system 1, the transmission unit Tx and the reception units $Rx_1$ to $Rx_8$ may be arranged so that the straight lines connecting them with each other form the lattice shape when seen from above. Thus, since the areas Z1 to Z8 in the water vapor observation area Z may be evenly set in terms of position within the water vapor observation area Z, all the relative water vapor amounts at the respective locations in the water vapor observation area Z may be evenly calculated.

Further in the water vapor observing system 1, the relative water vapor amounts $C_2$ to $C_8$ may be calculated based on the value obtained by subtracting the echo level of the first reception wave from the level of the transmission wave (first attenuation amount $A_1$) and the values obtained by subtracting the echo levels of the second reception waves from the level of the transmission waves (second attenuation amounts $A_2$ to $A_8$). Specifically, the relative water vapor amounts $C_2$ to $C_8$ may be calculated by multiplying the values which are obtained by subtracting the first attenuation amount $A_1$ from each of the second attenuation amounts $A_2$ to $A_8$, by the given constant. Thus, since the attenuation amount attributable to the factor other than water vapor included in each of the attenuation amounts $A_1$ to $A_8$ (other-factor-attributable attenuation amount) may be canceled out, the relative water vapor amounts $C_2$ to $C_8$ may suitably be calculated.

Further, the water vapor observing system 1 may use the radio wave having the frequency of 22 GHz. The radio wave having the frequency of 22 GHz may greatly attenuate by water vapor as described above. Therefore, using the radio wave having the frequency of 22 GHz as in this embodiment may enlarge, with reference to FIG. 5, ratios of the water-vapor-attributable attenuation amounts $Vap_1$ to $Vap_8$ to the other-factor-attributable attenuation amounts $Oth_1$ to $Oth_8$, respectively. Thus, a difference among the other-factor-attributable attenuation amounts $Oth_1$ to $Oth_8$ which occurs when subtracting the first attenuation amount $A_1$ from the second attenuation amounts $A_2$ to $A_8$ may cause little influence on the relative water vapor amounts $C_2$ to $C_8$. As a result, the relative water vapor amounts $C_2$ to $C_8$ may be calculated more accurately.

Further, the display unit 9 of the water vapor observing system 1 may indicate the position-based relative water vapor amount at each location by the color tone as an index expressing the water vapor amount. Thus, the user can easily grasp the position-based water vapor amount at each location.

Further, the display unit 9 of the water vapor observing system 1 may display the distribution image of the position-based relative water vapor amounts. Thus, the user can grasp the distribution of the position-based relative water vapor amounts in the water vapor observation area Z.

[Modification]

Although the embodiment of the present disclosure is described above, the present disclosure is not limited thereto, and various modifications are possible without departing from the scope of the present disclosure.

Figure 6:
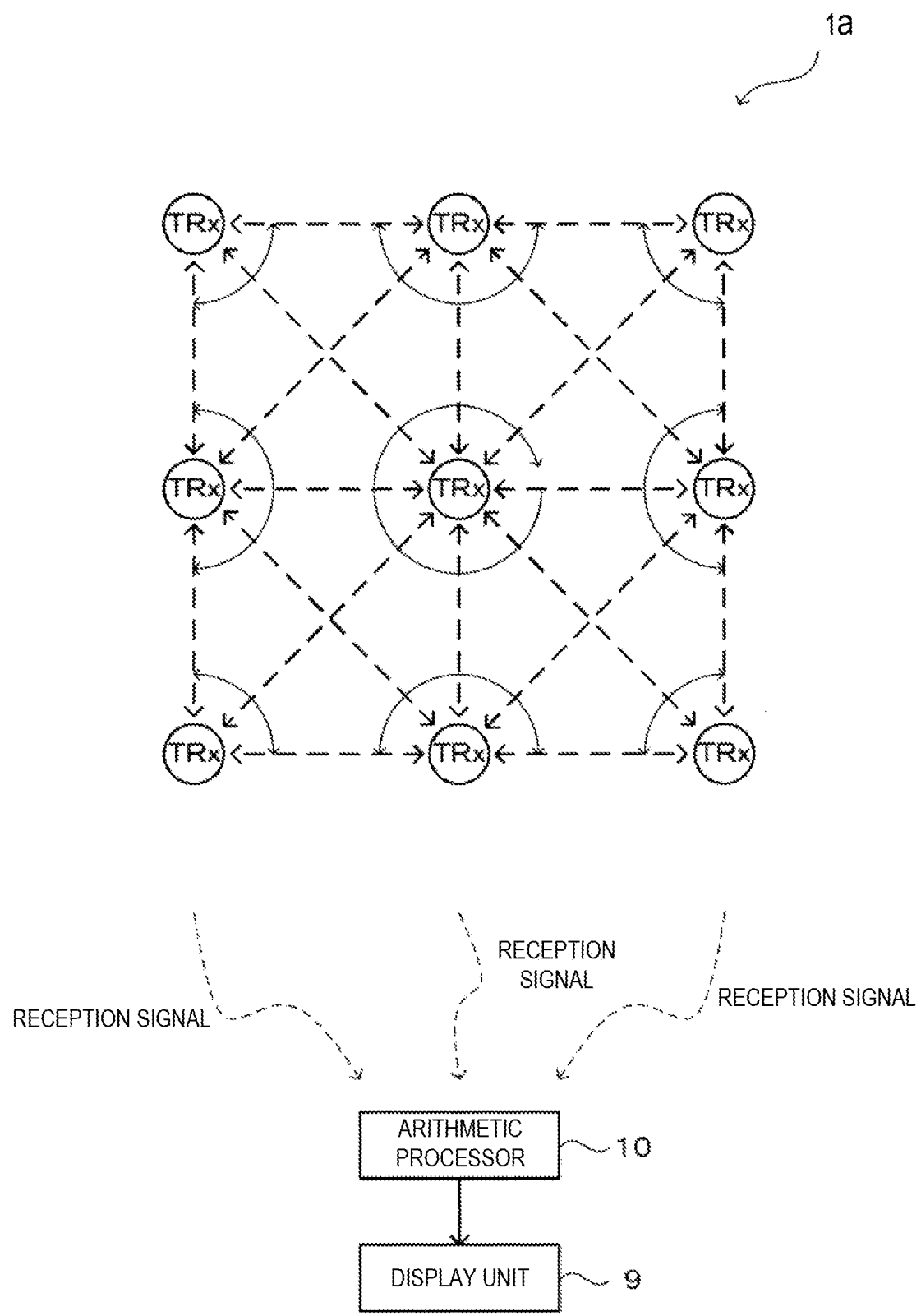
FIG. 6 is a schematic view illustrating a configuration of a water vapor observing system according to a modification.
Figure 7:
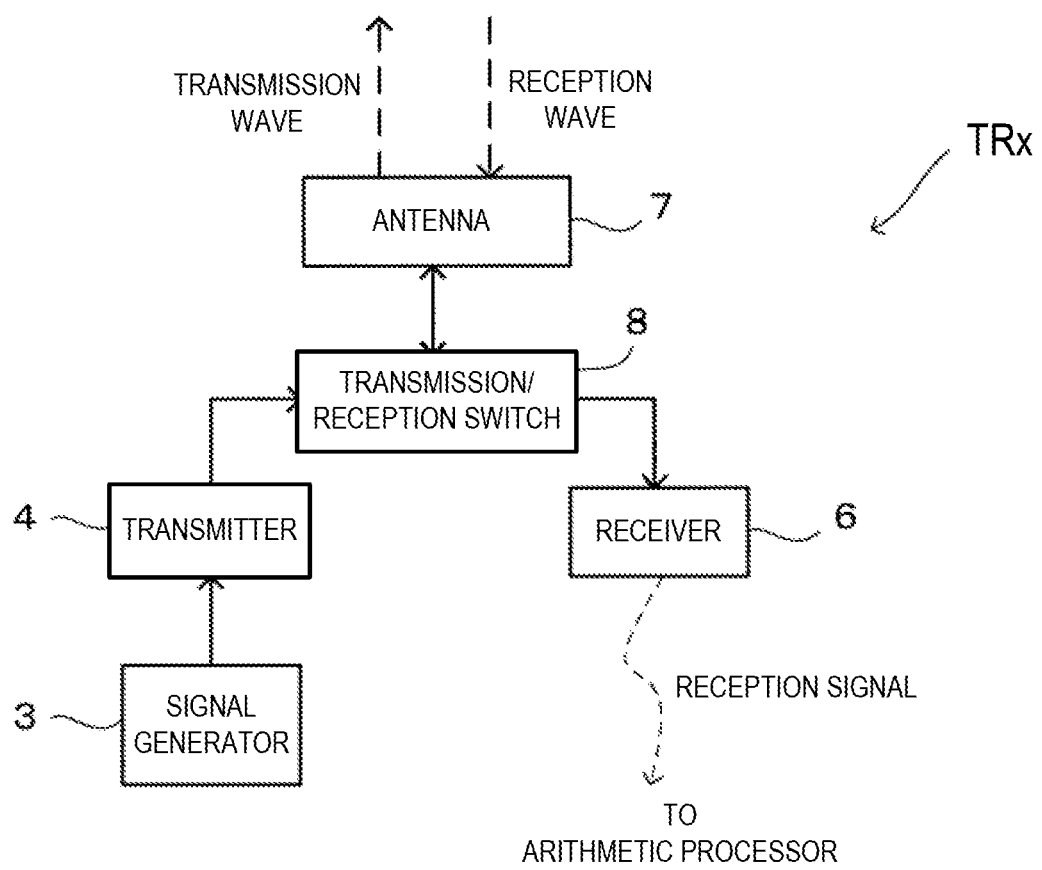
FIG. 7 is a block diagram illustrating a configuration of a transmission-reception unit illustrated in FIG. 6.

(1) FIG. 6 is a schematic view illustrating a configuration of a water vapor observing system 1a according to a modification. Further, FIG. 7 is a block diagram illustrating a configuration of a transmission-reception unit TRx of the water vapor observing system 1a. Although in the embodiment described above the water vapor observing system 1 may be configured to have one transmission unit Tx and the plurality of reception units Rx, it is not limited to this. Specifically, as illustrated in FIG. 6, the water vapor observing system 1a may be configured to have a plurality of transmission-reception units TRx. Note that below, parts of the water vapor observing system 1a of this modification different from the above embodiment are mainly described, and description of other parts thereof are omitted.

The water vapor observing system 1a may include the plurality of (in this embodiment, nine) transmission-reception units TRx, an arithmetic processor 10, and a display unit 9.

As illustrated in FIG. 6, the plurality of transmission-reception units TRx may be arranged so that straight lines connecting the plurality of transmission-reception units TRx with each other form a lattice shape when seen from above.

As illustrated in FIG. 7, each transmission-reception unit TRx may include an antenna 7, a transmission/reception switch 8, a signal generator 3, a transmitter 4, and a receiver 6. Description of the signal generator 3, the transmitter 4, and the receiver 6 is omitted since it is similar to the above embodiment.

The antenna 7 may be a radar antenna capable of both transmitting and receiving radio waves. Each antenna 7 may be configured to be rotatable as well as repeating the transmission and reception of the radio wave to and from the other antennas 7. Each antenna 7 may transmit the radio wave having the frequency of 22 GHz similarly to the case of the above embodiment. While traveling toward another antenna 7, this radio wave may attenuate by water vapor on the way and be received by the other antenna 7 as a reception wave. The reception wave may be outputted to the receiver 6 as a reception signal.

When transmitting, the transmission/reception switch 8 may switch its connection so that a transmission signal is transmitted from the transmitter 4 to the antenna 7. Further, when receiving, the transmission/reception switch 8 may switch its connection so that the reception signal from the antenna 7 is transmitted to the receiver 6.

Similar to the case of the arithmetic processor 10 of the above embodiment, the arithmetic processor 10 of this modification may also calculate the relative water vapor amounts $C_2$ to $C_8$ of the areas Z2 to Z8 based on the reception signals obtained from the reception waves received by the respective transmission-reception units TRx, and generate a distribution image of the relative water vapor amounts $C_2$ to $C_8$.

As described above, also with the water vapor observing system $1a$ of this modification, similar to the case of the above embodiment, a water vapor observing system capable of observing water vapor regardless of conditions of external systems may be provided.

Further, according to the water vapor observing system $1a$, the relative water vapor amounts $C_2$ to $C_8$ may be calculated more accurately. Specifically, for a pair of opposing transmission-reception units TRx, a more accurate relative water vapor amount may be calculated by averaging a relative water vapor amount calculated based on a transmission wave transmitted from one to the other unit, and a relative water vapor amount calculated based on a transmission wave transmitted from the other to the one unit.

Further according to the water vapor observing system $1a$, as illustrated also in FIG. 6, since the path through which the radio is transmitted and received may be increased in number compared to the case of the above embodiment, the water vapor distribution may be calculated at higher resolution.

Figure 8:
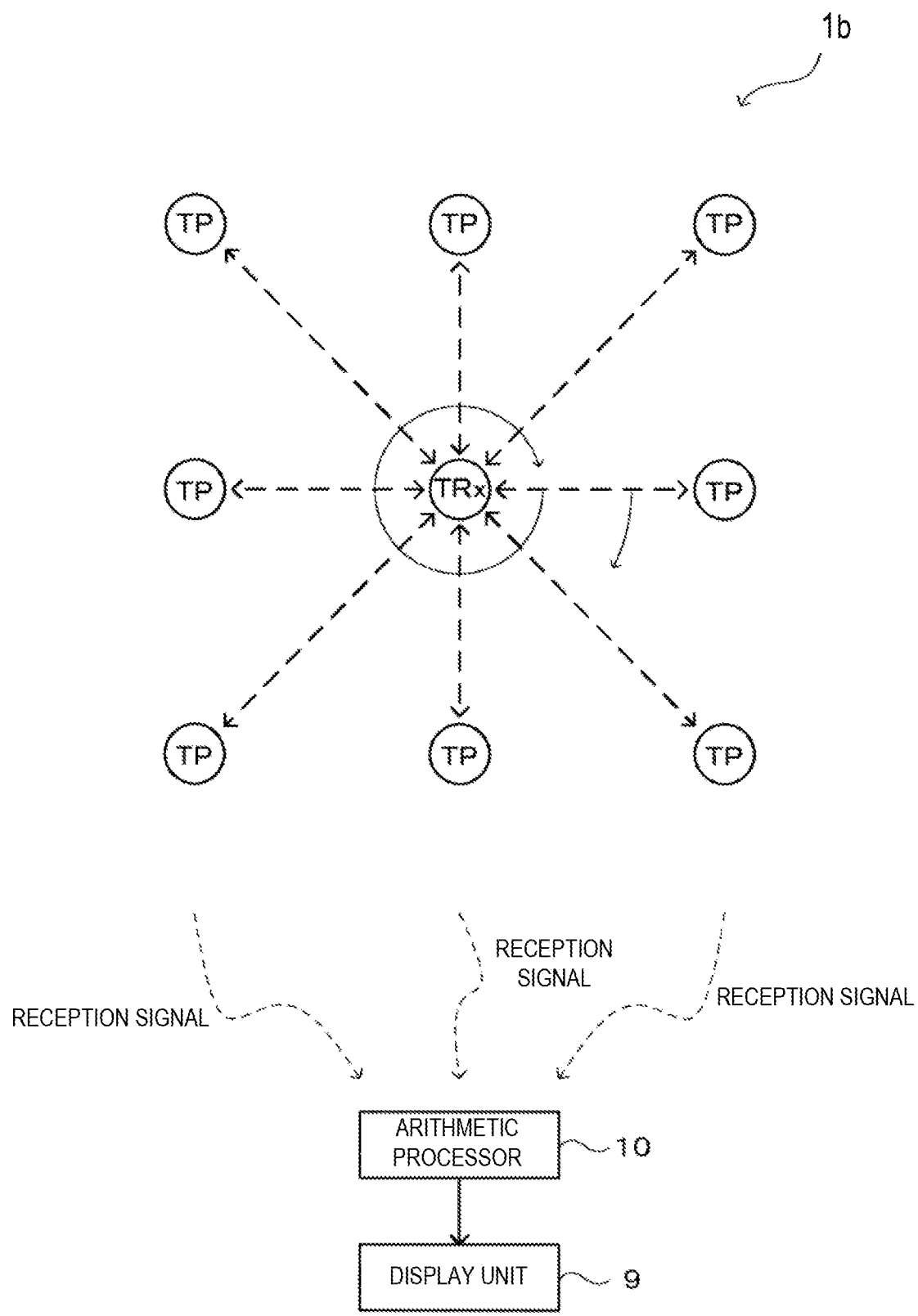
FIG. 8 is a schematic view illustrating a configuration of a water vapor observing system according to a modification.

(2) FIG. 8 is a schematic view illustrating a configuration of a water vapor observing system $1b$ according to a modification. Although in the embodiment described above the water vapor observing system 1 may be configured to have one transmission unit Tx and the plurality of reception units Rx, it is not limited to this. Specifically, it may be a configuration in which the reception units Rx of the above embodiment (see FIG. 1) are replaced with transponders TP (see FIG. 8). Even with such a configuration, similar to the case of the above embodiment, a water vapor observing system capable of observing water vapor regardless of conditions of external systems may be provided.

Further, according to the water vapor observing system $1b$, similar to the case of the water vapor observing system $1a$ of the modification illustrated in FIG. 6, the relative water vapor amounts $C_2$ to $C_8$ may be calculated more accurately. Specifically, for the transmission-reception unit TRx and a transponder TP opposing to each other, a more-accurate relative water vapor amount may be calculated by averaging a relative water vapor amount calculated based on a transmission wave transmitted from the transmission-reception unit TRx to the transponder TP, and a relative water vapor amount calculated based on a transmission wave transmitted from the transponder TP to the transmission-reception unit TRx.

Figure 9A:
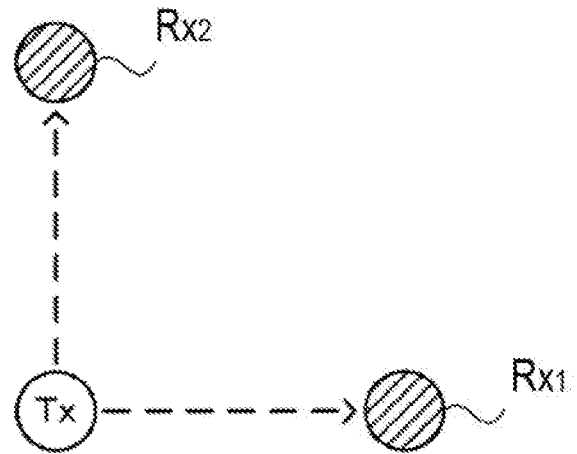
FIGS. 9(A) to 9(C) are views schematically illustrating a positional relationship of a transmission unit with reception units provided to a water vapor observing system according to modifications, respectively.
Figure 9B:
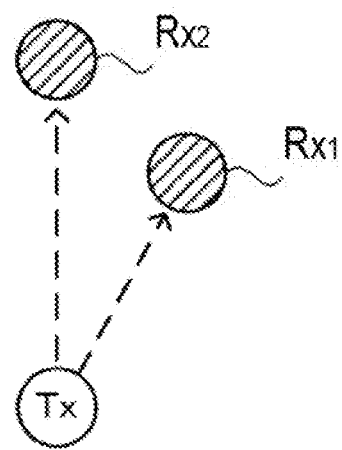
Figure 9C:
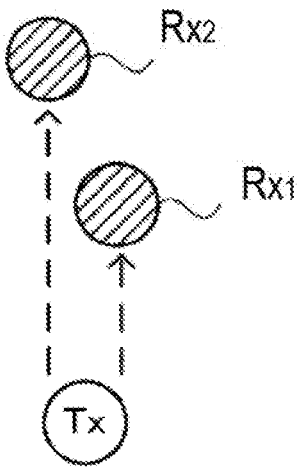

(3) FIGS. 9(A) to 9(C) are views schematically illustrating a positional relationship of a transmission unit Tx and reception units $Rx_1$ and $Rx_2$ provided to a water vapor observing system according to modifications, respectively. Although in the above embodiment the transmission unit Tx and the plurality of reception units Rx may be arranged so that the straight lines connecting the transmission unit Tx and the plurality of reception units Rx with each other form the lattice shape when seen from above, without limiting to this, other arrangement may be adopted. For example, as illustrated in FIGS. 9(A) to 9(C), the water vapor observing system may be configured to have a single transmission unit Tx and two reception units $Rx_1$ and $Rx_2$. In this case, as illustrated in FIGS. 9(B) and 9(C), by orienting the two reception units $Rx_1$ and $Rx_2$ to the same direction as much as possible with respect to the transmission unit Tx, the propagation paths of the transmission waves transmitted toward the reception units $Rx_1$ and $Rx_2$ may become close to each other compared to the case of FIG. 9(A). In this manner, the areas Z1 and Z2 approach each other and the difference between the other-factor-attributable attenuation amounts $Oth_1$ and $Oth_2$ in the areas Z1 and Z2 (see FIG. 5) becomes smaller, thus the relative water vapor amount may be calculated more accurately.

Figure 10:
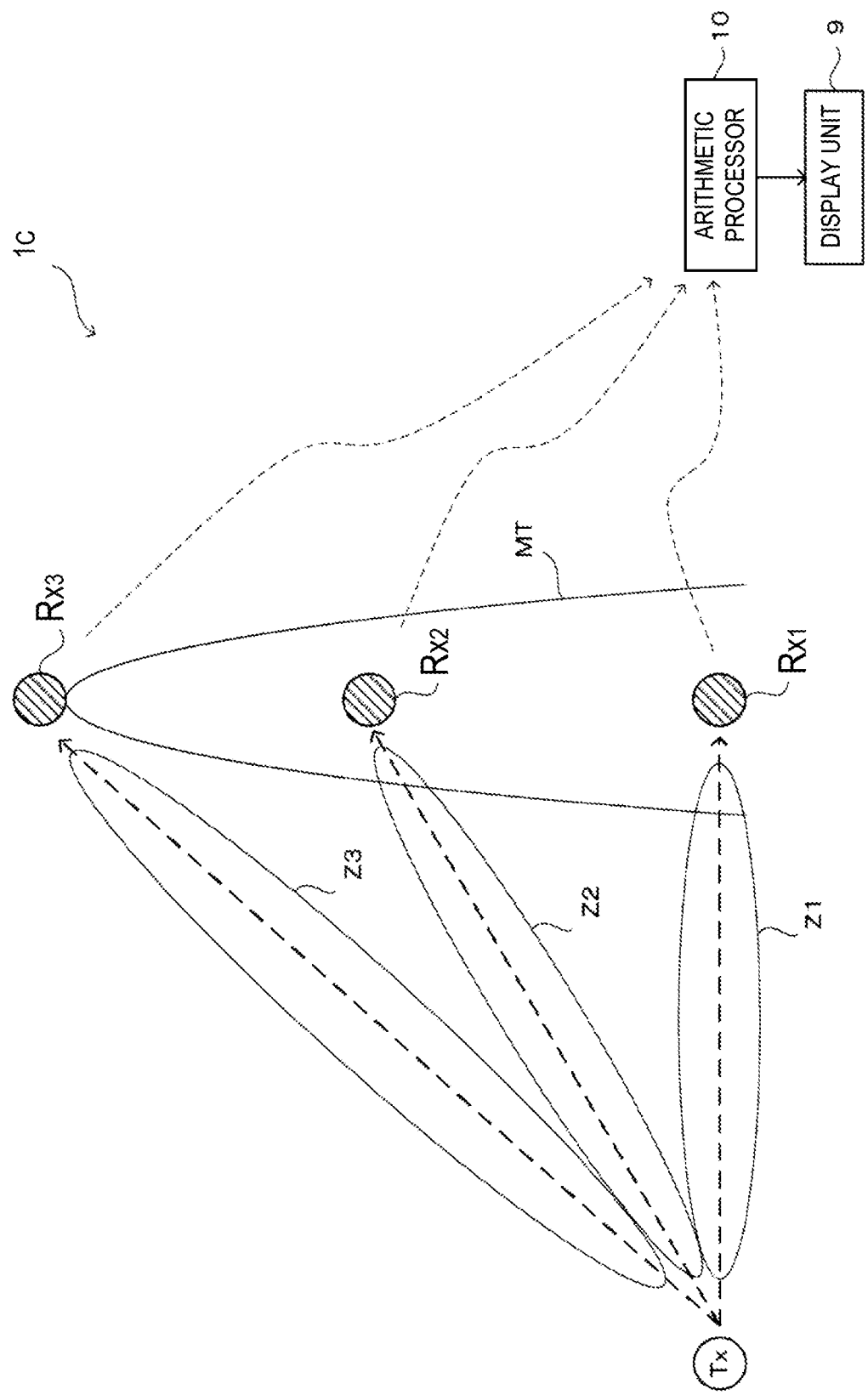
FIG. 10 is a schematic view illustrating a configuration of a water vapor observing system according to a modification.

(4) FIG. 10 is a schematic view illustrating a configuration of a water vapor observing system $1c$ according to a modification. In this modification, three reception units $Rx_1$ to $Rx_3$ may be disposed at different positions from each other. In the example of FIG. 10, the reception unit $Rx_1$ may be disposed at the foot of a mountain MT, the reception unit $Rx_2$ may be disposed on a hillside of the mountain MT, and the reception unit $Rx_3$ may be disposed at the top of the mountain MT. By disposing the plurality of reception units $Rx_1$, $Rx_2$ and $Rx_3$ at different height positions as described above, it may become possible to obtain the distribution of the relative water vapor amount in the vertical directions. Note that, in this modification, the target on which the reception units $Rx_1$ to $Rx_3$ are disposed may be other than the mountain, and it may be, for example, a pylon or a building etc.

(5) Although in the above embodiment the example in which the area used for the reference of the relative water vapor amount (reference area Z1) may be preset is given, it is not limited to this. Specifically, for example, the water vapor observing system may be configured such that an operation panel (not illustrated) etc. as a user-interface may be provided to the water vapor observing system so that the user operates the operation panel to set a desired reference area. Thus, since the user can set the desired reference area, a user-friendly water vapor observing system may be provided.

Figure 11:
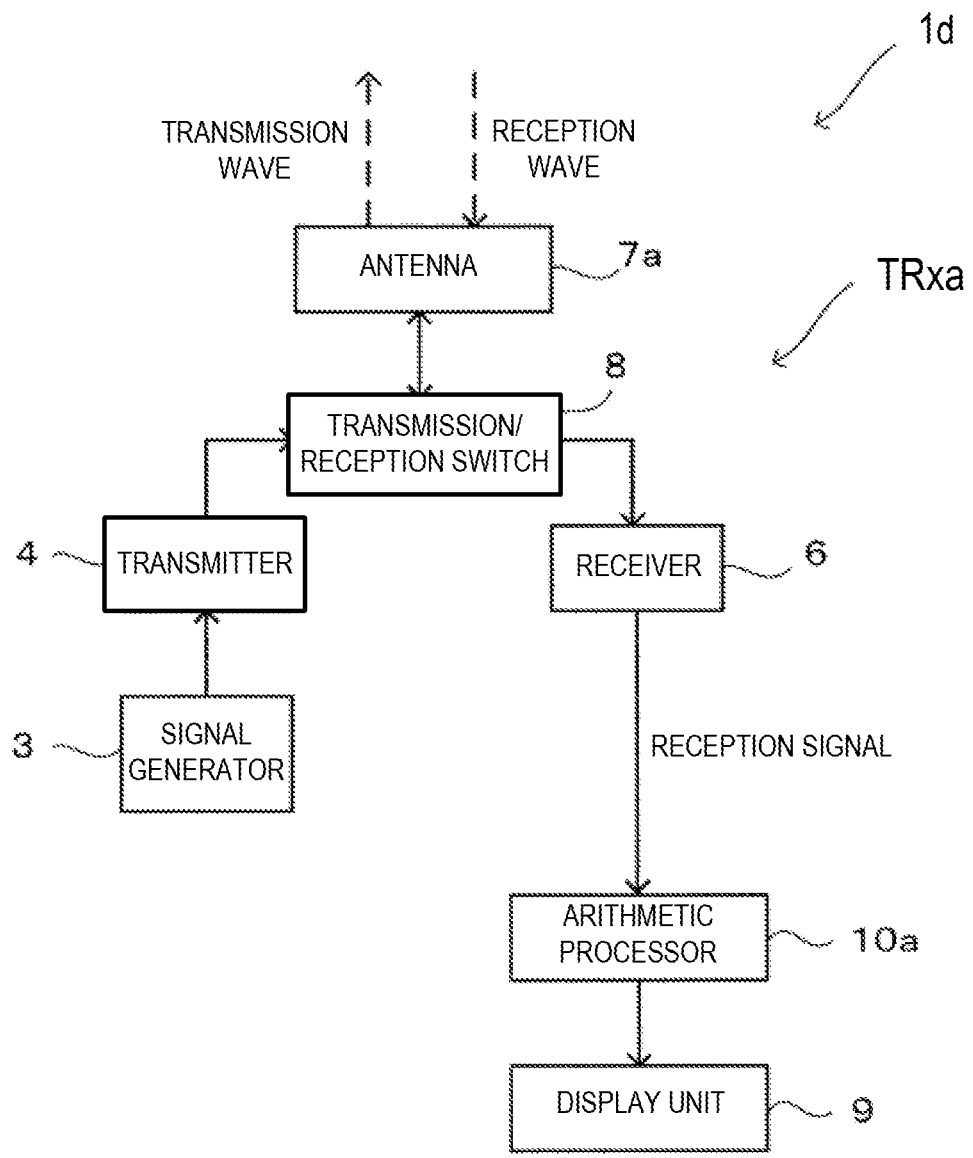
FIG. 11 is a block diagram illustrating a configuration of a water vapor observing system according to a modification.
Figure 12:
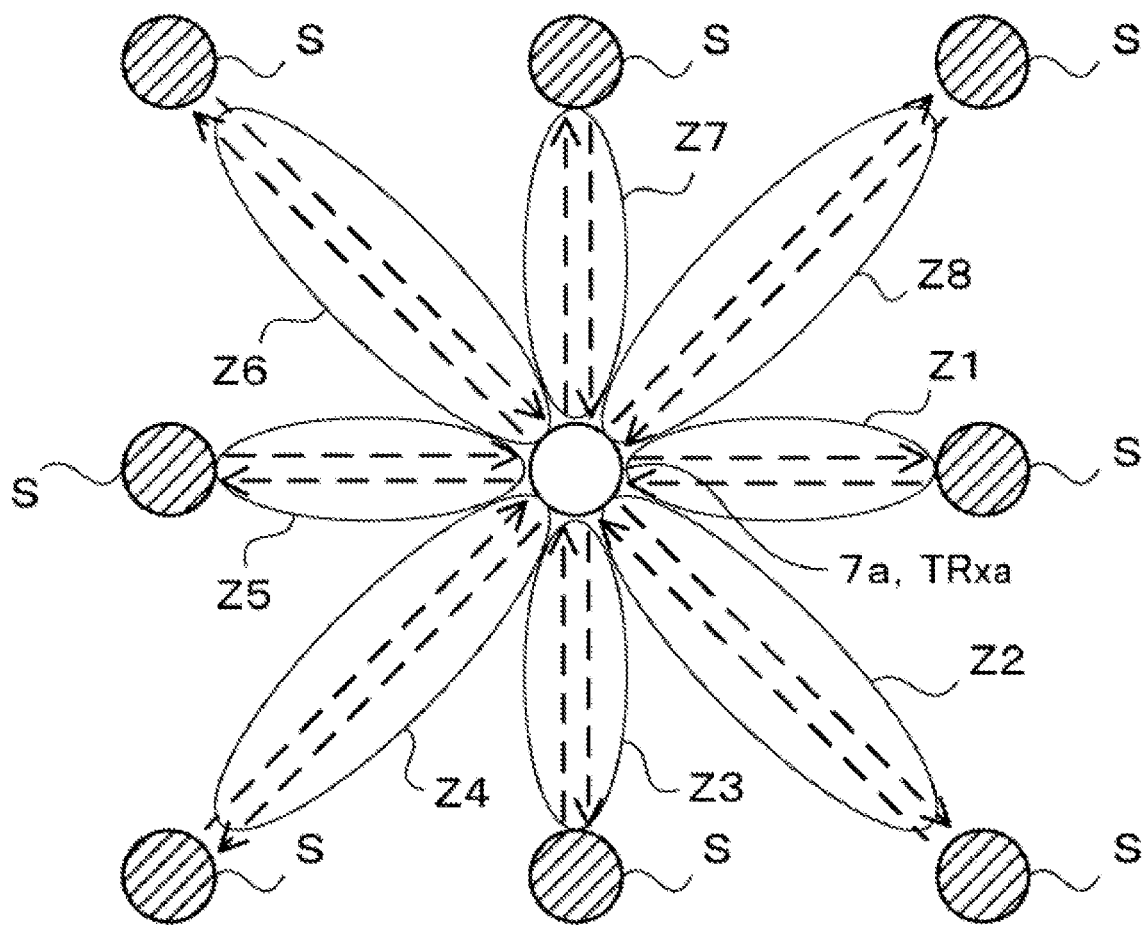
FIG. 12 is a view schematically illustrating a transmission-reception unit of the water vapor observing system illustrated in FIG. 11, transmission waves transmitted by the transmission-reception unit, and stationary objects on which the transmission waves reflect.

(6) FIG. 11 is a block diagram illustrating a configuration of a water vapor observing system $1d$ according to a modification. Further, FIG. 12 is a view schematically illustrating a transmission-reception unit TRxa of the water vapor observing system $1d$ illustrated in FIG. 11, transmission waves transmitted by the transmission-reception unit TRxa, and stationary objects S on which the transmission waves reflect.

Although in the above embodiment and modifications the position-based relative water vapor amount may be calculated as the reference water vapor amount which is the relative value of water vapor with respect to the reference water vapor amount as the comparison target, it is not limited to this. In this modification, a time-based relative water vapor amount may be calculated as the relative water vapor amount. This time-based relative water vapor amount may be an amount of water vapor in each area Z1 to Z8 through which the second transmission wave passes after the second transmission wave, which is to be transmitted later than the first transmission wave, is transmitted until it is received by the reception unit, with reference to the water vapor amount in the areas Z1 to Z8 through which the first transmission waves pass since the first transmission wave is transmitted until it is received by the reception unit. That is, the time-based relative water vapor amount may be a change rate of the water vapor amount in each of the areas Z1 to Z8. Note that, in this modification described below, the time-based relative water vapor amount may simply be referred to as the relative water vapor amount.

As illustrated in FIG. 11, the water vapor observing system $1d$ may include a single transmission-reception unit TRxa, an arithmetic processor $10a$, and a display unit 9.

The transmission-reception unit TRxa may include an antenna $7a$, a transmission/reception switch 8, a signal generator 3, a transmitter 4, and a receiver 6. In the transmission-reception unit TRxa, the antenna 7a may transmit the radio waves to the stationary objects S which are located at respective azimuths with respect to the antenna 7a, and receive the radio waves reflected on the stationary objects S while rotating on a horizontal plane (see FIG. 12). Then, in the transmission-reception unit TRxa, the antenna 7a may sequentially receive reflection waves (reception waves) from the respective azimuths, and the reception signals generated from the reception waves sequentially received may be outputted to the arithmetic processor 10a sequentially. Also in the case of this modification, the frequency of the radio wave transmitted and received by the transmission-reception unit may be set to 22 GHz.

Here, among the transmission waves described above, the transmission wave transmitted to each stationary object S first may be a first transmission wave, and the transmission waves sequentially transmitted after the first transmission wave may be second transmission waves. Further, the reflection wave of the first transmission wave may be a first reception wave, and the reflection waves of the second transmission waves may be second reception waves. Note that, the stationary object S may be a stationary object in the nature world (tree, land, mountain, etc.) or an artificial construction (building, pylon, etc.).

Figure 13:
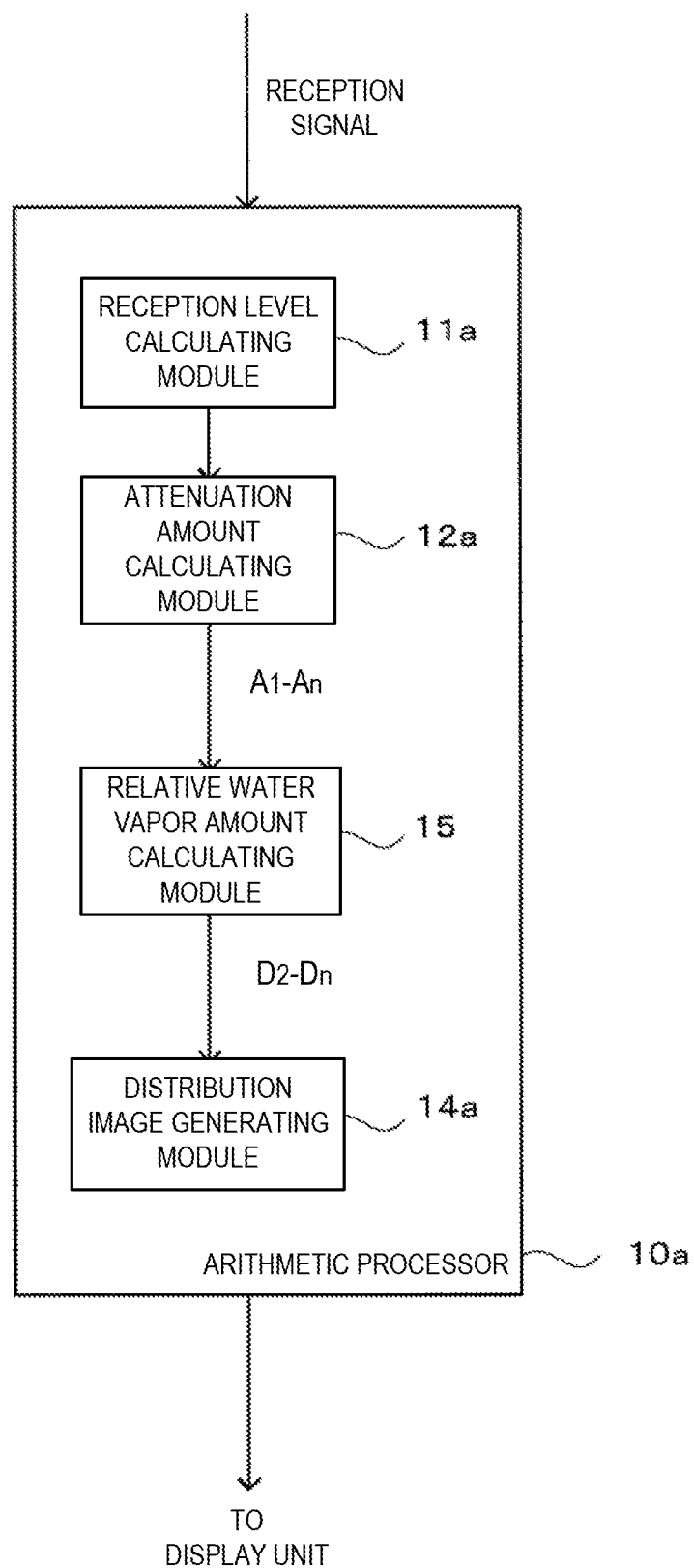
FIG. 13 is a block diagram illustrating a configuration of an arithmetic processor illustrated in FIG. 11.
Figure 14:
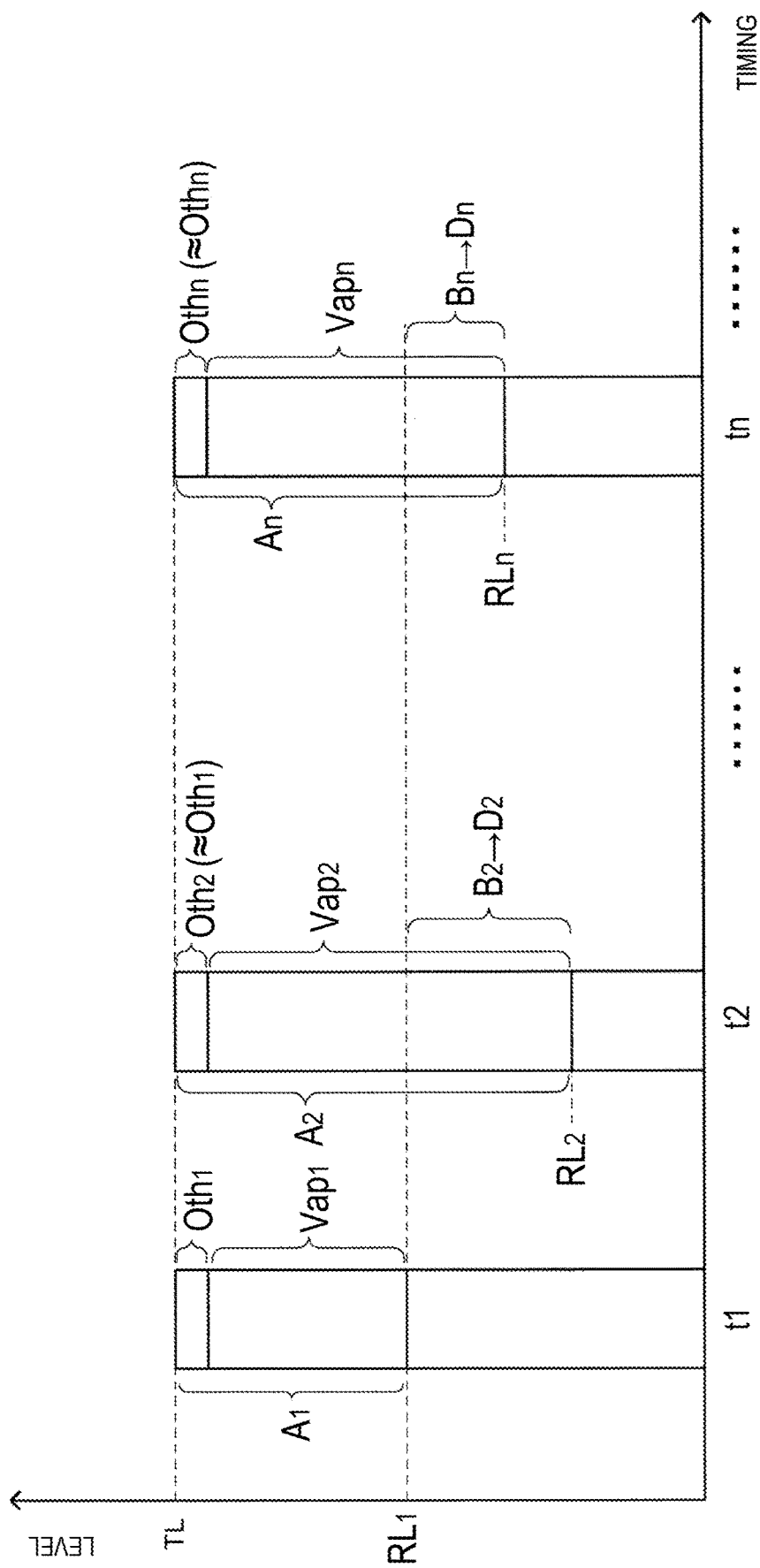
FIG. 14 is a chart illustrating an operation result obtained by processing performed by the arithmetic processor illustrated in FIG. 13.

FIG. 13 is a block diagram illustrating a configuration of the arithmetic processor 10a. Further, FIG. 14 is a chart illustrating an operation result obtained by processing performed by the arithmetic processor 10a. The arithmetic processor 10a may include a reception level calculating module 11a, an attenuation amount calculating module 12a, a relative water vapor amount calculating module 15 (time-based relative water vapor amount calculating module), and a distribution image generating module 14a.

The reception level calculating module 11a may calculate an echo level of the reception wave arriving from each azimuth based on a reception signal sequentially outputted from the transmission-reception unit TRxa.

With reference to FIG. 14, the attenuation amount calculating module 12a may subtract the echo level $RL_n$ of the reception wave at each timing tn (n=1, 2, . . . ) when the reception wave is received by the transmission-reception unit TRxa, from the level TL of the transmission wave transmitted by the transmission-reception unit TRxa for every azimuth at which the stationary object S is located, and calculate the subtraction value as the attenuation amount $A_n$. Note that, the value obtained by subtracting the echo level $RL_1$ of the first reception wave from the level TL of the first transmission wave may be calculated as the first attenuation amount $A_1$. Further, the values obtained by subtracting the levels TL of the second transmission waves by the echo levels $RL_2$, $RL_3$, . . . of the second reception waves may be calculated as the second attenuation amounts $A_2$, $A_3$, . . . .

With reference to FIG. 14, based on the attenuation amount $A_1$ in each area Z1 to Z8 at a preset reference timing t1 and the attenuation amount $A_n$ in the area Z1 to Z8 at timings tn (n=2, 3, . . . ) thereafter, the relative water vapor amount calculating module 15 may calculate for each area the water vapor amount at each timing tn (relative water vapor amount $D_n$) thereafter with reference to the water vapor amount at the reference timing t1. Specifically, the relative water vapor amount calculating module 15 may obtain a subtraction value $B_n$ by subtracting the attenuation amount $A_1$ at the reference timing t1 from the attenuation amount $A_n$ at the timing tn. Further, the relative water vapor amount calculating module 15 may calculate the relative water vapor amount $D_n$ (n=2, 3, . . . ) at each timing by multiplying each subtraction value $B_n$ (n=2, 3, . . . ) thus obtained by a given coefficient. The relative water vapor amount calculating module 15 may calculate the relative water vapor amount $D_n$ (n=2, 3, . . . ) for each of the areas Z1 to Z8. Note that, description of the reason why the relative water vapor amount calculating module 15 is able to obtain the relative water vapor amount $D_n$ by performing the above processing is omitted since it is similar to the above embodiment.

Figure 15:
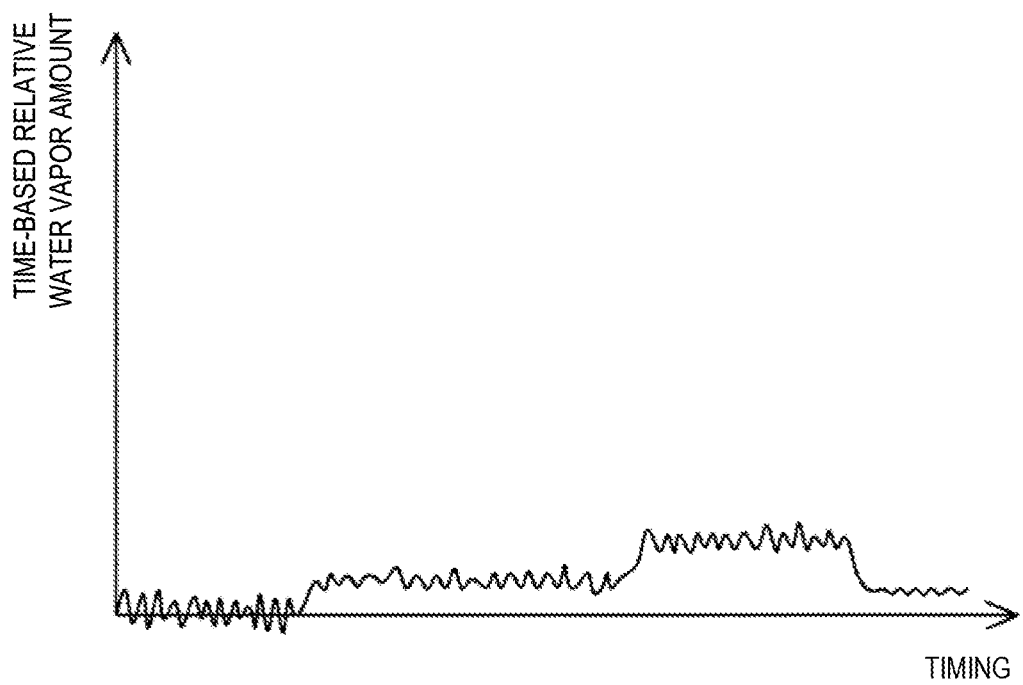
FIG. 15 is a chart illustrating one example of a graphed time-based relative water vapor amount calculated for each azimuth at which the stationary object is located.

FIG. 15 is a chart illustrating one example of a graphed relative water vapor amount $D_n$ in a certain area. According to the relative water vapor amount calculating module 15, the relative water vapor amount in each of the areas Z1 to Z8 (that is, a change of the water vapor amount over time at each timing tn from the water vapor amount at the reference timing t1) may be thus calculated.

The distribution image generating module 14a may generate a distribution image of the relative water vapor amount $D_n$ based on the relative water vapor amount $D_n$ in each of the areas Z1 to Z8 calculated by the relative water vapor amount calculating module 15. The distribution image generating module 14a may generate the distribution image of the relative water vapor amount $D_n$ in the water vapor observation area Z as needed based on the relative water vapor amount in each of the areas Z1 to Z8 calculated at every given timing (that is, at each timing t2, t3, . . . ).

The display unit 9 may display the distribution image of the relative water vapor amount $D_n$ generated by the distribution image generating module 14a. The distribution image displayed on the display unit 9 may be updated to the distribution image generated at a most-recent timing tn as needed. Note that, the display unit 9 may display the graph illustrated in FIG. 15 (the graph indicating the change of the water vapor amount in each area).

As described above, according to the water vapor observing system 1d of this modification, the relative water vapor amount $D_n$ may be calculated based on the radio waves transmitted by the system 1d. Therefore, according to the water vapor observing system 1d, a water vapor observing system capable of observing water vapor regardless of conditions of external systems may be provided.

Further, according to the water vapor observing system 1d, the water vapor amount at each timing tn (n=2, 3, . . . ) after the reference timing t1 with reference to the water vapor amount at the reference timing t1, that is the time-based relative water vapor amount $D_n$ (n=2, 3, . . . ), may be calculated. Thus, according to the water vapor observing system 1d, a change rate of the water vapor amount in the given area may be obtained.

Further, according to the water vapor observing system 1d, the relative water vapor amount $D_n$ may be calculated based on the value obtained by subtracting the echo level of the first reception wave from the level of the transmission wave (first attenuation amount $A_1$) and the value obtained by subtracting the echo level of the second reception wave from the level of the transmission wave (second attenuation amount $A_n$). Specifically, the relative water vapor amount $D_n$ may be calculated by multiplying the value which is obtained by subtracting the first attenuation amount $A_1$ from each second attenuation amount $A_n$, by a given constant. Thus, the relative water vapor amount $D_n$ may suitably be calculated.

Further, the display unit 9 of the water vapor observing system 1d may indicate the time-based relative water vapor amount at each location by a color tone as an index expressing the water vapor amount. Thus, the user can easily grasp the time-based reference water vapor amount at each location.

Further, the display unit 9 of the water vapor observing system 1*d* may display the distribution image of the time-based relative water vapor amounts. Thus, the user cap grasp the distribution of the time-based relative water vapor amounts in the water vapor observation area Z.

Figure 16:
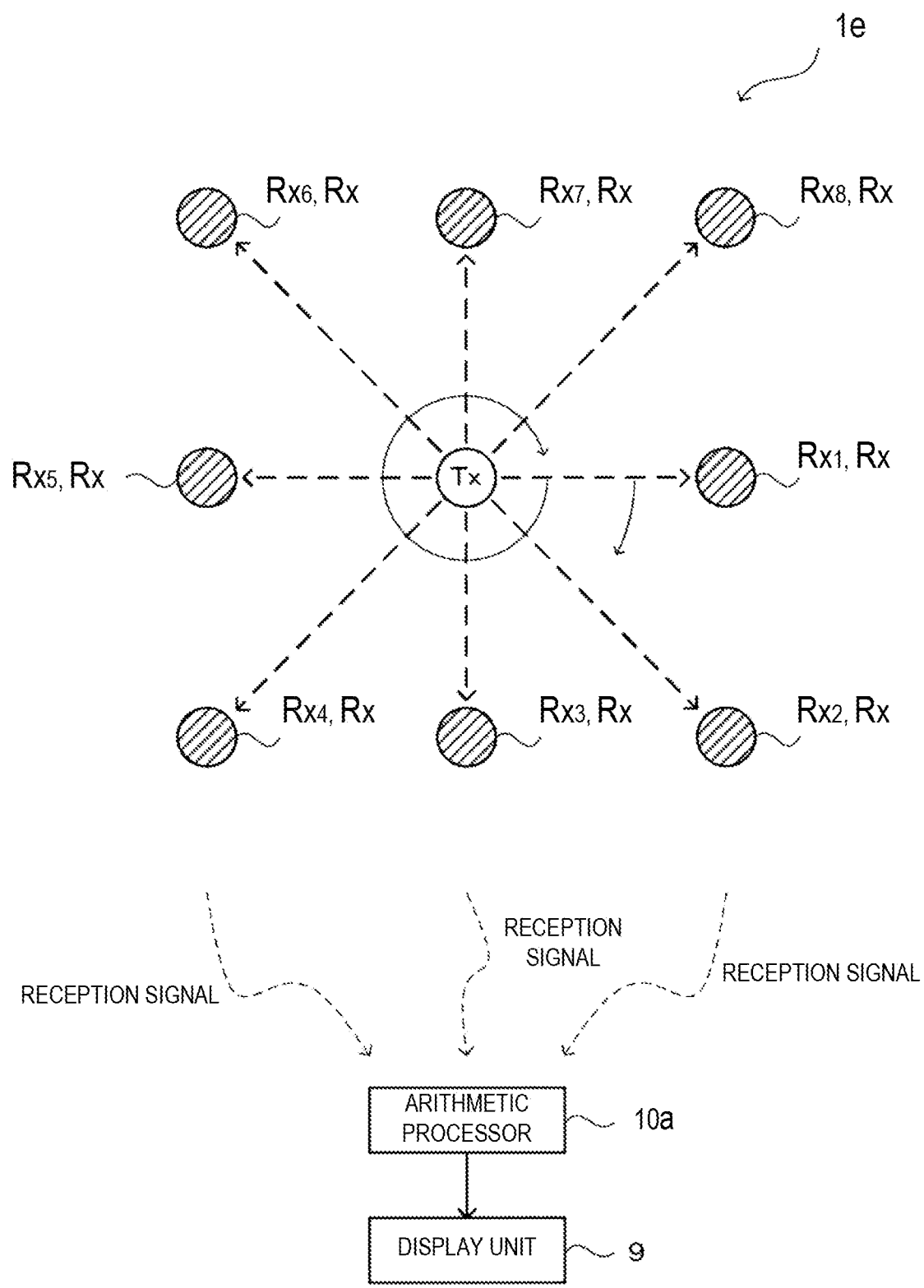
FIG. 16 is a block diagram illustrating a configuration of a water vapor observing system according to a modification.

(7) FIG. 16 is a block diagram illustrating a configuration of a water vapor observing system 1*e* according to a modification. In the modification illustrated in FIGS. 11 and 12, the water vapor observing system 1*d* having the transmission-reception unit TRxa constructed by integrating the transmission unit and the reception unit is described as an example of the configuration of the water vapor observing system which calculates the relative water vapor amount. Further, the water vapor observing system 1*d* may receive the reflection wave (reception wave) caused by the transmission wave, which is transmitted from the transmission-reception unit TRxa, reflected on and returned from the stationary object S, and calculate the relative water vapor amount $D_n$ based on the reception wave. However, without limiting to this, for example, the water vapor observing system 1*e* having the respective components illustrated in FIG. 16 may be configured.

In the water vapor observing system 1*e*, reception units Rx disposed at different positions from the transmission unit Tx may receive transmission waves transmitted from the transmission unit Tx as reception waves. Further, the water vapor observing system 1*e* may calculate a time-based relative water vapor amount in each area Z1 to Z8 at every given timing based on the reception wave received by each reception unit Rx, similarly to the case of the arithmetic processor 10*a* of the water vapor observing system 1*d* of the modification illustrated in FIGS. 11 and 12. The transmission unit Tx and the plurality of reception units Rx may be arranged so that straight lines connecting these units with each other form a lattice shape when seen from above.

As described above, in the water vapor observing system 1*e* of this modification, by providing the plurality of reception units $Rx_1$ to $Rx_8$, a distribution of change rates of the water vapor amount after the reference timing t1 with respect to the water vapor amount at the reference timing t1 may be obtained.

Further in the water vapor observing system 1*e*, the transmission unit Tx and the plurality of reception units $Rx_1$ to $Rx_8$ may be arranged so that the straight lines connecting them with each other form the lattice shape when seen from above. Thus, since the areas Z1 to Z8 in the water vapor observation area Z may be set uniform in position within the water vapor observation area Z, all the relative water vapor amounts in the water vapor observation area Z may be evenly calculated.

(8) Although in the modification illustrated in FIG. 16, the transmission unit Tx and the plurality of reception units Rx may be arranged so that the straight lines connecting the transmission unit Tx and the plurality of reception units Rx with each other form the lattice shape when seen from above, without limiting to this, other arrangement may be adopted. For example, the arrangement of the transmission unit Tx and the plurality of reception units $Rx_1$ and $Rx_2$ may be as illustrated in FIGS. 9(A) to 9(C). Alternatively, a water vapor observing system including a single transmission unit Tx and a single reception unit Rx may be configured.

(9) Although in the modification illustrated in FIG. 16, the transmission unit Tx and the plurality of reception units Rx may be arranged in the planar shape, without limiting to this, for example with reference to FIG. 10, the reception units may be arranged at different height positions from each other. By disposing the plurality of reception units $Rx_1$, $Rx_2$ and $Rx_3$ at different height positions as described above, it may become possible to obtain the distribution of the relative water vapor amounts in the vertical directions.

(10) Although in the above embodiment the example in which the radio wave having the frequency of 22 GHz is used as the transmission wave is described, without limiting to this, a radio wave in another frequency band may be used as long as it has a water-vapor-absorbable frequency (e.g., 183 GHz).

(11) Although in the embodiment illustrated in FIG. 1, etc., the example in which the plurality of reception units Rx may be arranged two-dimensionally is described, it is not limited to this. For example, the plurality of reception units may be arranged three-dimensionally. In this manner, it may become possible to generate the three-dimensional distribution of the relative water vapor amounts.

DESCRIPTION OF REFERENCE CHARACTERS

1, 1*a*-1*e* Water Vapor Observing System
Tx Transmission Unit
TP Transponder (Transmission-reception Unit)
TRx, TRxa Transmission-reception Unit (Transmission Unit, Reception Unit)
Rx, $Rx_1$-$Rx_8$ Reception Unit
13 Relative Water Vapor Amount Calculating Module (Position-based Relative Water Vapor Amount Calculating Module)
15 Relative Water Vapor Amount Calculating Module (Time-based Relative Water Vapor Amount Calculating Module)

The invention claimed is:

1. A water vapor observing system for observing water vapor contained within atmospheric air, comprising:
    a transmitter circuitry positioned on a ground and configured to transmit at least a transmission wave;
    a first receiver circuitry positioned at a different position from the transmitter on the ground and configured to receive the transmission wave as a first wave;
    a second receiver circuitry positioned at a different position from the transmitter and the first receiver circuitry on the ground and configured to receive a second wave from the transmitter circuitry; and
    processing circuitry configured to calculate a first relative amount of water vapor in a first passing area of the first wave and a second relative amount of water vapor in a second passing area of the second wave based on a first attenuation amount obtained by subtracting an echo level of the first wave from a level of the transmission wave from the transmitter circuitry and a second attenuation amount obtained by subtracting an echo level of the second wave from the level of the transmission wave.

2. The water vapor observing system of claim 1, wherein the second receiver circuitry comprises a plurality of second receiver circuitries positioned at different positions from each other.

3. The water vapor observing system of claim 2, wherein the transmitter circuitry, the first receiver circuitry, and the plurality of the second receiver circuitries are arranged so that straight lines connecting them with each other form a lattice shape when seen from above.

4. The water vapor observing system of claim 1, wherein the first receiver circuitry and the transmitter circuitry are configured as a transceiver.

5. The water vapor observing system of claim 1, wherein the second receiver circuitry is a transponder that transmits a transmission wave in response to receiving the second wave.

6. The water vapor observing system of claim 1, wherein one of the transmitter circuitry and the receiver circuitry is positioned higher than the other.

7. The water vapor observing system of claim 1, further comprising a display configured to display an index of the relative amount of water vapor.

8. The water vapor observing system of claim 7, wherein the index is a distribution of the relative amount of water vapor.

\* \* \* \* \*